US 8,280,904 B2

(12) United States Patent
Bartholomew

(10) Patent No.: US 8,280,904 B2
(45) Date of Patent: Oct. 2, 2012

(54) ANNOTATION SYSTEM FOR CREATING AND RETRIEVING MEDIA AND METHODS RELATING TO SAME

(75) Inventor: Alan Bartholomew, Pasadena, CA (US)

(73) Assignee: Trio Systems, LLC, Pasadena, CA (US)

( * ) Notice: Subject to any disclaimer, the term of this patent is extended or adjusted under 35 U.S.C. 154(b) by 0 days.

(21) Appl. No.: 13/161,859

(22) Filed: Jun. 16, 2011

(65) Prior Publication Data

US 2011/0246514 A1    Oct. 6, 2011

Related U.S. Application Data

(63) Continuation of application No. 12/420,619, filed on Apr. 8, 2009, now Pat. No. 7,992,215, which is a continuation of application No. 10/707,413, filed on Dec. 11, 2003, now Pat. No. 7,536,713.

(60) Provisional application No. 60/432,888, filed on Dec. 11, 2002.

(51) Int. Cl.
G06F 17/30 (2006.01)

(52) U.S. Cl. ........ 707/769; 713/171; 713/173; 713/174; 726/27

(58) Field of Classification Search .................. 707/769; 713/171, 172, 173, 174; 726/3, 4, 5, 6, 27, 726/30; 380/230, 232, 233
See application file for complete search history.

(56) References Cited

U.S. PATENT DOCUMENTS

| 7,536,713 | B1 * | 5/2009 | Bartholomew | 726/7 |
|---|---|---|---|---|
| 7,992,215 | B2 * | 8/2011 | Bartholomew | 726/30 |
| 2005/0091311 | A1 * | 4/2005 | Lund et al. | 709/203 |
| 2009/0150444 | A1 * | 6/2009 | Cohen et al. | 707/104.1 |
| 2009/0198685 | A1 * | 8/2009 | Bartholomew | 707/5 |
| 2009/0210946 | A1 * | 8/2009 | Cohen et al. | 726/27 |
| 2009/0235364 | A1 * | 9/2009 | Cohen et al. | 726/28 |
| 2009/0300480 | A1 * | 12/2009 | Cohen et al. | 715/234 |
| 2010/0017885 | A1 * | 1/2010 | Cohen et al. | 726/26 |
| 2010/0154065 | A1 * | 6/2010 | Cohen et al. | 726/28 |
| 2010/0169410 | A1 * | 7/2010 | Lund et al. | 709/203 |
| 2011/0246514 | A1 * | 10/2011 | Bartholomew | 707/769 |
| 2011/0289098 | A1 * | 11/2011 | Oztaskent et al. | 707/769 |

* cited by examiner

*Primary Examiner* — Jean M Corrielus
(74) *Attorney, Agent, or Firm* — Fox Rothschild, LLP; Carol E. Thorstad Forsyth

(57) ABSTRACT

The invention described herein is generally directed to a method and apparatus for creating and retrieving audio data. In one implementation the invention comprises an annotation system configured to record, store, and retrieve media. The annotation system contains a set of client-processing devices configured to capture media for subsequent playback. Each client-processing device typically contains a record button to initiate the capture and is configured upon performing the capture operation to trigger an association of a unique ID with the media. The client-processing devices are further configured to upload the media and a unique ID to a server for purposes of storage. The server obtains the media and unique ID for subsequent retrieval and provides the media and the unique ID to at least one client-processing device from the set of client processing devices.

18 Claims, 3 Drawing Sheets

ANNOTATION SYSTEM FOR CREATING AND RETRIEVING MEDIA AND METHODS RELATING TO SAME

CROSS-REFERENCE TO RELATED APPLICATIONS

This application is a continuation of U.S. application Ser. No. 12/420,619, filed on Apr. 8, 2009, which is a continuation of U.S. application Ser. No. 10/707,413, filed on Dec. 11, 2003, now U.S. Pat. No. 7,536,713, which claims the benefit of U.S. Provisional Application 60/432,888, filed on Dec. 11, 2002. The teachings of all of these applications are incorporated herein by reference.

FIELD OF THE INVENTION

The invention relates to the field of computer software and hardware. More specifically, embodiments of the invention relate to, but are not explicitly limited to, a method and system for creating and retrieving audio data.

DESCRIPTION OF THE RELATED ART

The reason people typically make audio, video, pictures or other such media recordings is to capture an event for subsequent playback. Existing technologies provide adequate mechanisms for creating such media recordings; however, existing systems for cataloguing and subsequently retrieving these recordings are cumbersome and lack the flexibility and usability required to achieve useful access to the knowledge contained in the media. Thus there is a need for a simplified solution for recording information (e.g., media) at its source and subsequently retrieving that information.

SUMMARY OF THE INVENTION

The invention described herein is generally directed to a system for creating and retrieving audio data and methods relating achieving such functionality. In one implementation the invention comprises an annotation system configured to record, store, and retrieve media. The annotation system contains a set of client-processing devices configured to capture media for subsequent playback. Each client-processing device typically contains a record button to initiate the capture of media and is configured upon performing the capture operation to trigger an association of a unique ID with the media. The client processing devices are further configured to upload the media and a unique ID to a server for purposes of storage. The server obtains the media and unique ID for subsequent retrieval and provides the media and the unique ID on request to at least one client-processing device from the set of client processing devices. The at least one client-processing device may then playback or otherwise utilize the media as appropriate.

DETAILED DESCRIPTION

The invention described herein is generally directed to a method and apparatus for creating and retrieving audio data. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention. Although the term audio data is utilized throughout this document, readers should note that one or more embodiments of the invention are adaptable for use with video recordings, text entries, collections of multimedia information, photos, or any other type of recorded data including but not limited to multiple media types in a single file or across several different files. The term system, as set forth herein, refers to software and/or hardware components configured to implement one or more aspects of the invention. The term user may refer to a person or be a general reference to the system. The term server (see e.g., FIG. 3, element 314) refers to any kind of software process or device which may reside on the client-processing device itself or on a separate device. When the server is on the client-processing device it may share a process implementing embodiments of the invention, execute in a separate process, or be a separate device contained within the client-processing device.

The reason people typically make audio, video, or other such data recordings is to capture an event for subsequent playback. Existing technologies provide adequate mechanisms for creating data recordings; however, the process of cataloguing and subsequently retrieving such recordings is often cumbersome. Embodiments of the invention solve this and other problems by providing an improved methodology for retrieving recordings (or portions of recordings) that have identifiable value.

Figure 1:
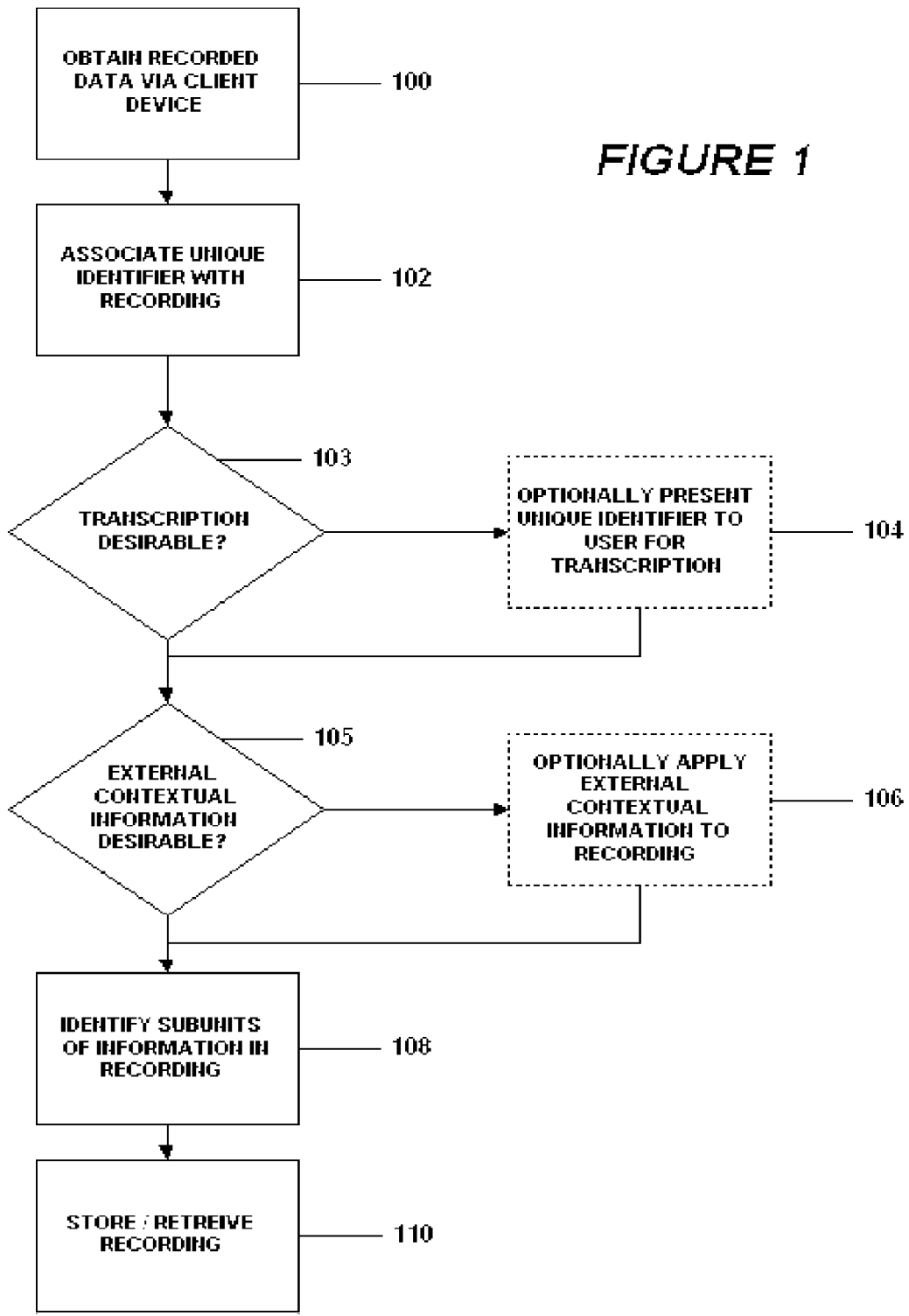
FIG. 1 illustrates that embodiments of the invention provide users with a mechanism for creating or obtaining a recording (e.g., audio, video, etc.) on a client-processing device (e.g., any device configured to obtain digital or analog data).
Figure 3:
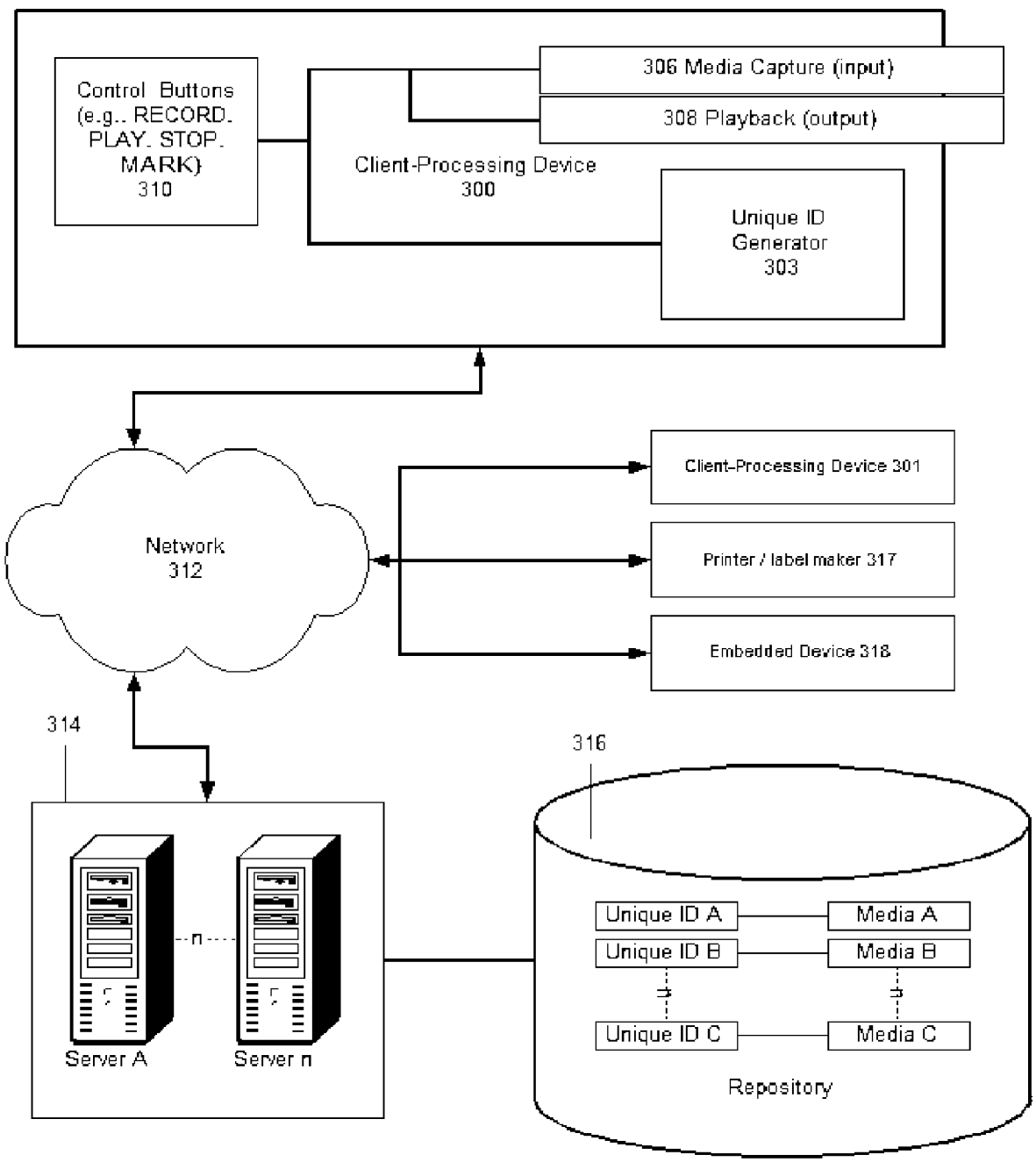
FIG. 3 illustrates a generalized view of an annotation system embodying one or more aspects of the invention.

As FIG. 1 illustrates, embodiments of the invention provide users with a mechanism for creating or obtaining a recording (e.g., audio, video, etc.) on a client-processing device (e.g., any device configured to obtain digital or analog data, FIG. 3, elements 300 and 301). Some examples of the types of devices that may serve as client processing devices include, but are not limited to, software or hardware based recording systems, combined software and hardware devices, or other devices capable of obtaining data (e.g., via an import or download function). The client-processing device can be configured to capture (e.g., via media capture/input, FIG. 3, element 306) or playback media (e.g., via playback/output, FIG. 3, element 308). One or more embodiments of the invention are implemented via a dedicated handheld device having modules configured to provide one or more of the following features:

Record media (audio, video, still image, scan text, etc).
Apply a unique ID to the media (e.g., by generating or obtaining a unique ID via unique ID generator, FIG. 3, element 303).
Display the unique ID (if not captured from a bar code or similar already external ID).
Deliver the unique ID to a server for purposes of storage, retrieval, and other types of processing
Upload the media including the unique ID to a server (e.g., a general purpose repository) (e.g., FIG. 3, element 316). This can be via any network (e.g., FIG. 3, element 312) or live connection (LAN, WiFi, BlueTooth, etc), or at a later time (such as via a docking station).

Associate contextual information with media.

Display/play media that has been captured.

Display/play media from a server, based on unique ID (entered into the device by some means, such as typing in the ID, or scanning it from a bar code, speaking the ID, or any other input method).

Contain or access a bar code scanner for application of the unique ID, or contextual information.

Contain or access a label dispenser (e.g., FIG. 3, element 317) that emits preprinted labels with unique numbers. This could be used in conjunction with the bar code scanner.

Contain or access a label printer to output the unique ID. This could be either on label material, or directly to paper that the device is held against.

Utilize and embed record/Stop/Play/Undo/Mark functionality described herein and the Position Slider device described herein.

Cell phones, PDAs or any other computational or analog device (e.g., client-processing device) can be adapted to contain one or more aspects of the features described herein.

At step 100 the system captures information at or conveniently proximate to the point of origin (e.g., via an information capture mechanism such as an audio, video or other data capture device). In most situations where information is generated, there is a gap between what is documented and what is lost. Knowledge workers attempt to compensate for the lack of written documentation by keeping the information in their heads and orally passing that information to others. More often, however, helpful information is lost rather than retained. By simplifying the mechanism for recording information at its source, the probability of information being captured, rather than lost, significantly increases. By recording in audio form or video form, a much greater range of detail is captured than otherwise would be in written form, and such recorded information fits with the tradition of oral transmission.

Once the appropriate data is recorded, a unique identifier or reference data is associated with the recording (e.g., at step 102). Some examples of the different types of unique identifiers that fall within the scope of the invention include, but are not limited to, a number assigned by a server process, a machine unique identification (ID) combined with a locally unique identifier, a number assigned from a range of numbers specified by an active, or part-time server process, and a number generated by an algorithm likely to produce a unique number (such as the GUID method used by Microsoft to identify COM objects). Other examples include a number generated from a combination of an algorithm and an assignment from a server process (for example, Client A is instructed by a server to assign all even numbers and Client B is instructed to assign all odd numbers), and/or any other methodology or its equivalent capable of generating a unique or pseudo-unique identifier.

Digitally captured recordings can be assigned a file name unique in a local context but not unique within a larger global context, such as a shared server environment. For example, digital dictation devices will assign a file name to the recording, but when the file is uploaded to a computer, the user may be required to change the name to avoid a conflict with other previously uploaded files. By assigning a unique number to the file at the client, when the recording is made (or imported into the system), the system has a mechanism for moving data (e.g., audio data) between different components of the system, without losing track of its globally unique identity and without having to change the identifying value "downstream" from the point of origin. If the user is going to transcribe this ID (see e.g., steps 103, 104), the numeric representation utilized affects the ease with which the user is able to copy the number. A number that is easy to remember and/or copy is preferable for situations where manual transcription is desirable. For example, a nine-digit number, like 123-456-789 is easier than a very large number, like 1234-5678-9123-4567.

At step 104, the unique identifier is optionally presented to the user. For instance, at the time the recording is made (or imported) the system may optionally present the user with the unique identifier. If the user is presented with the unique identifier, the user can transcribe the identifier by placing it in a physical context that allows for future retrieval. This step is optional in instances where the external contextual information described in 106 is added to the recording (as access to the information must be from either the unique identifier or the external contextual information). Alternatively, the system embodying one or more aspects of the invention may automatically transcribe the unique identifier for the user. For instance, the unique identifier may be saved on the client processing device and if necessary a server system. Once saved, there are various contexts in which the system may present the unique identifier to the user. For instance, the system may display the unique identifier for the user to manually copy to a piece of paper or computer document/database/ etc. or transfer the unique identifier to a client-side or server-side application automatically or semi-automatically (e.g., by inserting the number into a database automatically, or placing the number in the system clipboard for the user to paste into a word processing document). The system may print the unique identifier for subsequent usage. A user may, for instance, wish to have a sheet of paper printed that indicates the unique identifier for filing with paperwork related to the recording. The system may optionally be configured to print a bar code representation of the unique identifier applicable to objects that may form the context for future retrieval of the audio recording (e.g., a legal file) or the system may assign the unique identifier by scanning a pre-printed bar code. In other instances, the system may record the unique identifier in some other machine-readable format, such as a magnetic stripe, flash memory, smart card memory, diskette, or other electronic storage format (some of which have yet to be invented).

The system may also record the unique identifier onto any medium having transmission capabilities. For instance, devices with Radio Frequency ID capabilities or other such transmission mechanism may store and if necessary broadcast the unique identifier. In one embodiment of the invention, ID tag devices are configured to store (e.g., in memory) and transmit (e.g., FIG. 3, element 318) a unique identifier. One or more client-processing devices are configured to receive the unique identifier and associate captured annotation information with the unique identifier supplied by the ID tag device. The ID tag device can then be attached to or associated with an object (e.g., physical file) to which the unique identifier relates. When the user encounters the object they can use the client-processing device to receive the unique identifier and retrieve media associated with that identifier. This by implication allows the user to obtain media associated with a particular object. The annotation may contain contextual information. That contextual information can be used to locate the unique identifier via a database query. Once the system determines the unique identifier of the ID tag device in question, radio tracking technology can be used to locate the physical location of the tag.

Software configured to monitor such ID tag devices can pinpoint and inform the user of the location of any object having one or more embedded devices where each ID tag device has a unique identifier. For instance, doctors, lawyers, or other workers, may use such ID tag devices to uniquely identify, annotate, and locate files (e.g., patient, client, or other files), or other physical objects.

An objective of step 104 is to allow the user to retrieve the audio recording by locating the unique identifier within an application or physical context. For example, the recording could be a comment about paperwork that a knowledge worker is processing. The ID could be applied to a written document during the workflow. Someone later in the workflow process (or even the same person at a later time) would have the ability to retrieve that recording by requesting it from a server, using the unique identifier provided on the paper document. Thus, the system enables knowledge workers to quickly pass along details (personal knowledge) about the document in an efficient form so that the workers would not need to compose written statements to enter into the file. In addition, the statement need not be transcribed, because others would have access to the comment (or, if speech-to-text technology is used, a written representation of the comment) in its original audio form. This process is similar to way that doctors and lawyers currently use dictation equipment to more quickly record knowledge for entry into a filing system. The invention complements such habits while removing (or making optional) the transcription step. By storing the unique identifier in a context where it will be discovered when it is relevant, the user will be able to access the recording when needed. This procedure is different from storing the context of the audio recording in the recording entry itself.

At steps 105 and 106, the user can optionally apply external contextual information to the recording. For instance, at the time of making the recording, or at a later time, the user(s) can apply contextual information to be stored with the recording itself or in files associated with the recording for purposes of subsequent retrieval. The system may also generate contextual information by using "descriptors" to catalog the contents and scan a document or subject identifier bar code to obtain a pointer to external information. Step 106 can also be accomplished using any technique for associating context data (location, time, names, dates, etc.) with the recording. For instance, the user may simply enter a file name that alludes to the nature of the information in the recording, enter keywords relating to the content, select from predefined categories, such as client name, project title, etc., enter unique identifiers that are assigned outside of the program itself, or enter pointers to other information, such as key values to access database records that are related. The system may also be configured to combine a descriptive file name or other data with the unique recording identifier. In this embodiment of the invention, the user may enter a typical "file name" (e.g., a local or global file name). The system then appends the unique identifier that serves two purposes: to ensure the uniqueness of the file name and to allow for location of the recording via a search for the unique identifier.

The value of having a context stored directly with the recording is that it gives another method for retrieving the information in addition to the unique identifier. This would be a more typical approach for most audio applications to use. For example, the user would enter the client name and subject matter in a file name associated with a recording about that client. Later, retrieval would be possible by looking at a list of file names and selecting a file to listen to that could apply to the information being sought. In one or more embodiments of the invention the system is configured to add external references through the use of a descriptor database that can be used to specifically classify the contents (e.g., using XML or any other appropriate data structure or data representation). For instance Knowledge Based Broadcasting and Classification scheme, for example, as described elsewhere in this document could be used for this purpose to classify the contents of a descriptor database containing the external references.

At step 108, the system may identify subunits of information in the recording. An objective of this step is to mark (also referred to as bookmark) certain points in the recording that contain information for subsequent use. Performance of this step may occur either during the recording, or after the recording, and the invention is therefore not limited explicitly to performing the recording at a particular point in time. In one embodiment of the invention, the user indicates to the system what points in the recording are notable. For instance, the user could mark what parts of a speech are of interest. If the speech follows an agenda, the user could use the marking process to associate certain aspects of the speech with the agenda items. The program generates an entry into the file (or a paired file containing bookmarks). This entry contains, a program generated unique identifier that will allow direct access to that point in the recording. The method for generating the unique identifier is the same as described in step 102 and the unique identifier may optionally be presented to the user, as described in step 104, for the ID associated with the file. In addition, subunits may be identified with external contextual information, as previously described.

Thus, systems configured in accordance with the embodiments of the invention described here enable users to identify any point in the file with the same level of detail for direct playback access, as if it were a file. This system allows for sections within the recording to be treated with the same access functionality as the file itself. For instance, the file may be separated into individually accessible portions that are interrelated. Such individual pieces of a file may be organized by mark (e.g., idea) or some other manner. This approach differs from bookmarks in that the Unique ID is not tied to a particular time and/or a locally unique document context. Rather the identifiers are globally unique and globally accessible.

Once the subunit of an audio file is uniquely identified and identified with external contextual information, the user may directly access that point in the file. This identification can be entered into a filing system or database for accessing the data across physical files. An example application would be the recording of meetings, where events in the meeting can be identified for direct access at a later time. If keywords were entered into the system to identify a subunit, a database query for such keywords would provide for retrieving the file, locating the offset position of that subunit using the unique ID, and playing it back. By having a unique identifier, it would also be possible to place entries for that subunit into other databases. For example, if the purpose of the meeting was to specify requirements for developing a software system, the various requirements requests made in the meeting could be identified as subunits. These subunits could then be entered into a database for requirements management purposes. A manager processing requirement requests would be able to listen to a specific request made at the meeting, enhancing that person's ability to more accurately determine the nature of the request. In fact, because of the specificity of the pointer (unique identifier) from the requirements management database to the point in the subunit of the recording, the audio record of the meeting could form (in part) a legal basis for the contract to produce the software system.

At step 110, the user must store and/or retrieve data recordings via a repository (e.g., a central server, distributed server system, a replicated server, a local computer, removable or recorded media). For instance, once the data recording is completed and identified, it is stored in a repository accessible to one or more users (e.g., local or global users). When a file is submitted for inclusion in the repository, the various identifying information contained in the recording is extracted and entered into the database of the repository. From the repository, the system provides a mechanism for one or more users to recall the audio recording (as a whole unit, or its subparts) based on the unique identifier, and/or external contextual information.

Once the recording is stored in a repository, it can be provided for playback (e.g., at step 110) access to anyone with physical access to the server (and necessary permissions, of course). Various mechanisms can retrieve and utilize the recorded data. A cell phone, PDA, personal computer or any other type of computation device or remote access device (including analog devices), for example, could be designed or adapted to retrieve and review the recorded data. By entering a unique identifier, context information, and/or other search parameters, the system could retrieve the appropriate file and provide it to the user for playback.

The system has multiple uses. Some examples of such uses include, but are not limited to, the following:

1. Storing notes to the file for medical, legal or accounting professionals, to assist in collecting information about the actions of the professional.
2. Capturing orally transmitted information in an organization in such a way as to make it available after the person with the knowledge leaves the organization.
3. Speeding up the production of notes for future reference, rather than having to type a formal memo.
4. Recording meetings where people will need to access portions of the meeting at a later time.

In any of the above identifier instances (or others not mentioned here but to which the invention is applicable) the use of a unique ID for recordings and subsections of recordings provides an ideal way to access information. Users can access any point in the recording from a server using the ID, without having to know the context of that recorded segment (such as the file in which it is contained). In addition, the annotation of the sections of the recording is an example of the addition of contextual data relative to that location. In at least on embodiment of the invention it is feasible to separately store annotations and data.

In at least one instance, embodiments of the invention described throughout this document can be implemented as a general-purpose annotation system. In such cases a stronger emphasis is placed on the text-oriented usages of these methods, however as was described above, other approaches are also feasible. The general-purpose annotation system comprises a built-in methodology for annotating any document or real-world event or thing and it not necessarily limited to computer documents, although such documents are likely to be the most common application. The general-purpose annotation system may include client-side software or a hardware device configured to capture annotation information such as text, audio, video, or other data (e.g., via a "Capture Application"). The Capture Application provides a mechanism for treating new annotation references and thereby creates an Annotation Object. Information contained in the Annotation Object ("Annotation Data") may consist of typed text, digital ink, digital audio, digital image, or any other digital media. The Capture Application automatically generates a globally unique identifier ("UID") for this annotation object. The Capture Application presents the UID to the user, and/or automatically inserts this value into a computer application (text document, database, spreadsheet, etc) that the user is annotating. When the UID is inserted into an existing file, document or database, the UID associated with Annotation Object also serves as a unique reference to the data at the location where it has been inserted ("Reference Data"). In this case the Annotation Data includes an addition item, a reference to the location ("Reference Location") where the annotation was inserted. In the case of an audio recording the Reference Location typically contains a unique pointer to the audio file containing the reference and the time offset into the audio file. In the case of a word processing document (or other document file, such as an spreadsheet), the Reference Location typically contains a unique pointer to the document file containing the reference and an implied offset into the document, which is located through a physical search of the document at retrieval time. In the case of a database record (or in the case of object-oriented databases, a database object), the Reference Location contains a unique primary key value of the record.

Readers should note that other types of digital information may be also referenced using one or more embodiments of the invention and that the examples given are provided only to illustrate the concepts described herein. The UID can be presented in the form of a unique character or numeric sequence, or it may be in the form of the UID embedded or encoded in an Internet URL to allow for direct access to the Annotation Object by clicking on the link in applications that support the feature of clicking on links.

Embodiments of the invention contemplate the use of a server repository for storing and accessing annotation information ("Annotation Server"). Users can access Annotation Object by presenting the UID to the Annotation Server. Implementation of this retrieval process may vary, but in one embodiment of the invention may utilize:

A web-enabled process to deliver the Annotation Objects to a web browser display.
    A phone interface where the data is presented in audio form (converting text to audio, if required).
    A dedicated hardware device that accesses the Annotation Server through a communications channel.
    Specification of the UID for Purposes of Retrieval can be by:
    Direct entry of the UID into the Annotation Server system (either via a client or web interface).
    Accessing the Annotation Object by requesting a web page with a UID embedded in a URL.
    Retrieving of Information:
    Retrieve the Annotation Data.
    Retrieve Reference Data from a file, document, or database record by following the Reference Location pointer.

EXAMPLE APPLICATIONS

As an example, embodiments of the invention provide a mechanism for users to review a shared word processing document on a server. A user could, for example, select an annotation button to add an annotation to a document. This would generate a UID and a URL or some other reference for retrieving the annotation. The annotation URL can then be inserted automatically into the current cursor location in the document and a window region (e.g., popup window) presented to the user for purposes of creating Annotation Data such as: Enter text annotation.

Record audio annotation.

Record video annotation.

Enter digital image annotation.

The Annotation Object that results from this user interaction is stored on a Annotation Server (either at that moment, or at a later time through a docking or synchronization operation). At the time of creating the Annotation Object, the user has the option to manually copy the UID for future reference. Users can retrieve the Annotation Data by clicking on the URL in the document. Users can retrieve the document and position to the Reference Location by entering the UID at the Annotation Server (either through a client application, or a browser-based interface), or clicking on the URL stored in some other location on the Internet, which causes the Annotation Server to return the document through a web browser.

Description of a Hardware Device Incorporating the Methodology:

Systems implementing the methodology described above can be any device (e.g. including but not limited to a personal computer, PDA, cell phone, or other portable computer or dedicated hardware device) configured to perform one or more aspects of the invention. For instance, a hand-held computing/hardware device may provide the ability to record and retrieve audio (and photo/video/text/multimedia) clips associated with information in the workplace. The device may have this functionality shared with other uses, such as cell phone, email, web browsing, etc. and have the ability to record dictation for creating new clips. For other types of media, the device utilizes other input hardware, such as a camera, keyboard, and/or touch sensitive screen. When the user encounters a situation requiring audio annotation, the device provides a mechanism for making an audio recording.

The device can be configured to display the audio recording unique identifier or print a barcode for application to physical objects in the work environment. For example, if a user were commenting on a loan request document, there may be things a supervisor finds that require revision. The supervisor would dictate the needed changes. To associate this recording with the paperwork, there would be several variations of how it would work. The user could hand-transcribe (e.g., write) the unique identifier to the document. The device could print a barcode for application to the document or the user could scan a barcode that appears on the document to associate the recording with the document. The recording device has either direct access to the remote repository through a wireless connection or it can transfer the recording to the server using a docking methodology, similar to synchronizing a Palm Pilot™ with a PC computer.

Retrieval is possible from such a device using the unique identifier to locate the recording. Playback from the server may execute through a wireless e.g., via Wireless Access Protocol (WAP) when the user swipes the barcode of the recording, or enters the unique identifier manually. The device may play the digital audio file from the server to the speaker/headphone of the device. Retrieval is possible through a computer system attached to the server, and through a phone server configured to play back a file when given the unique identifier or some other retrieval parameter.

While there is nothing in this system that precludes the transcription of audio dictation, an objective is to obviate the need for such transcription. By making the audio readily available at all times, the time cost of retrieving recordings such as an audio file (i.e., the longer time to listen to the audio than it would take to read the same information) is outweighed by the timesaving in transcription. In addition, the ease of making a recording, compared to other methods of making a permanent record of the information, encourages a greater quantity of information to be recorded. While the user may not be likely to retrieve every recording made, the value of the recording that is retrieved is typically very high. For example, if a user listens to only one recording in a thousand, but the information contained in that recording is indispensable to the work, then having a system as described herein is well worth the cost.

Information conveyed via audio lacks aspects of the event conveyed via other ways. For instance, verbal gestures contain information that will not appear in a transcribed or written record. For many types of applications, where social or emotional information is expressed in the nuance of the spoken word, audio recordings will be essential to storage of the information.

Interface Controls:

Another aspect, incorporated within one or more embodiments of the invention, utilizes a unique approach to recording dictation, involving a combination of user interface elements not yet implemented in other products. What distinguishes this new approach is the ease with which a user can record and manipulate dictation using controls having only at least two states when pressed (e.g., on and off). The combination of steps, where the recording is typically forced to the end of the file and an undo operation of the last segment is allowed, is made possible through the use of a simple interface control involving the Record, Mark, Stop, Play, and Undo buttons (e.g., a set of control buttons, see FIG. 3, element 310). An embodiment of the invention also incorporates the ability to edit audio content using a simple text-based interface. The text interface provides a simplified representation of the recorded information, with controls familiar to non-technical users.

Figure 2:
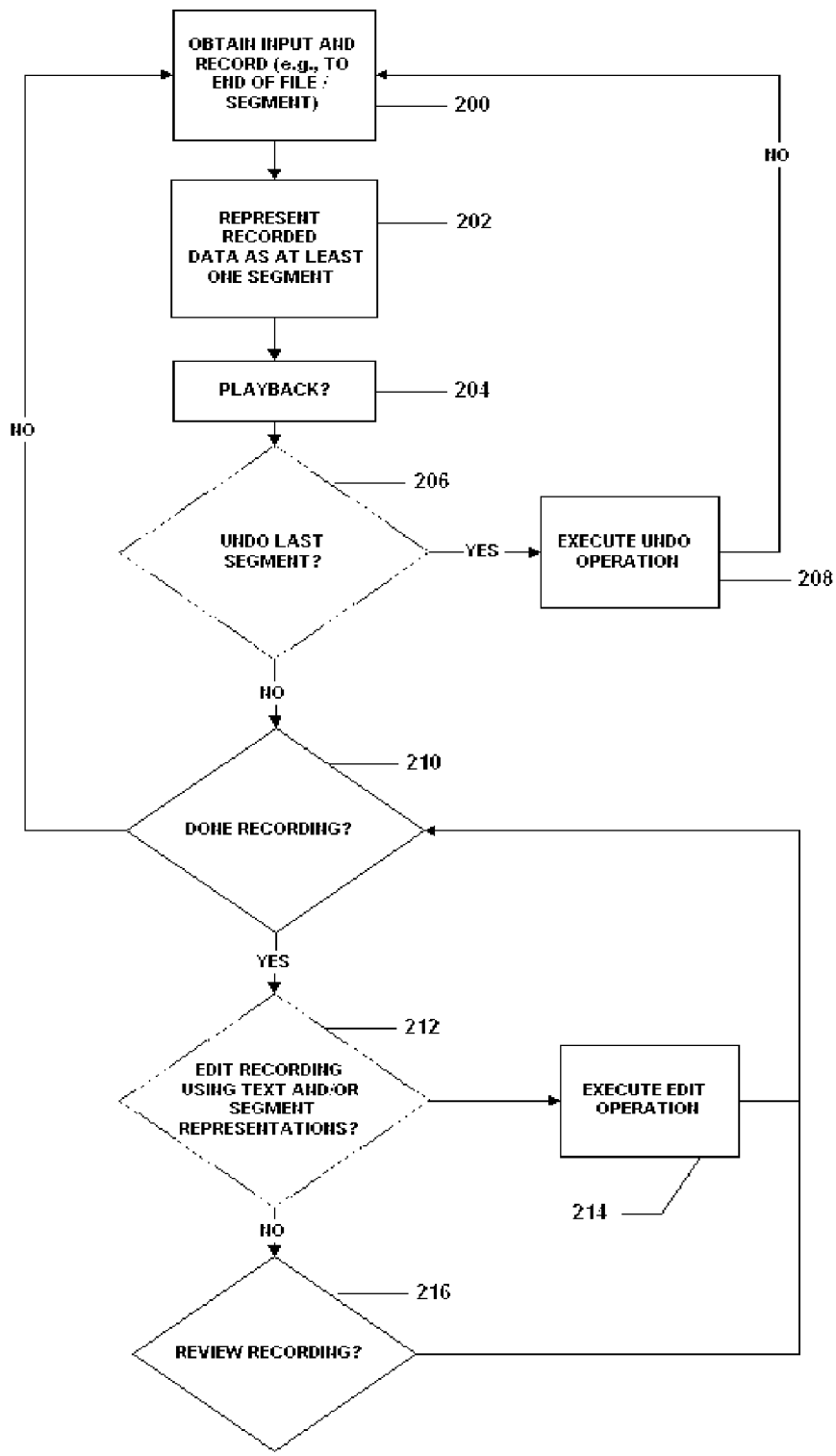
FIG. 2 illustrates the process and functionality made possible when using an interface configured in accordance with one or more embodiments of the invention.

Description of Method:

FIG. 2 illustrates the process and functionality made possible when using an interface configured in accordance with one or more embodiments of the invention. Allowing users to record into the middle of an audio file is useful for re-recording musical passages in multi-track recording projects; however, such recording is not typically desirable when recording dictation. At step 200 of FIG. 2, the interface is configured to record to end of file or to the end of a particular segment representing an end point. The interface may have various functionalities associated with obtaining the recording. For instance, when the user presses the Record button, the system may automatically position the record pointer to the end of the file, irrespective of the current location of the playback pointer. Once the data is obtained the system may represent the recorded data as one or more segments (see e.g., step 202). At step 206, recorded data (e.g., audio data) is represented as a set of separate sections. For instance, as an extension to the recording of dictation in sections, the system can keep track of each segment that is recorded as a separate entity, rather than a contiguous recording. This enables users to manipulate the recording of each section after recording later sections in the file. In addition, the user may revise the order of each section within the recording as a whole by simply moving the section in the user interface. There are various mechanisms for accomplishing such functionality each of which are contemplated within one or more embodiments of the invention. The software may, for example, segment the sections based on start/stop operation of the user interface and/or detect sections of audio based on speech patterns (time and frequency analysis). Or clicking mark button. The user could manually segment the recording using editing methods (such as an extension of the text processing method described in step 212, and/or a graphical tree processing display). Such functionality provides the user with a mechanism for organizing audio sections much like the user would organize sections of a written text, giving almost as much flexibility in creating a finished audio recoding as is possible with typed text.

When implemented, the use of segments gives users the ability to freely record, edit, and review without forcing the user to operate in sequence. If, for example, segments 1 thru 10 have already been recorded and the user is in the process of reviewing segment 3 (see e.g., playback at step 204), pressing record will cause the system to create segment 11. When the user presses the Record button, talks, and then presses the Stop button, the system keeps track of the starting and stopping location in the file. The user can optionally press an Undo button that causes the system to execute an undo operation (see e.g., steps 206/208) that erase an identified segment (e.g., the last recorded segment). The Undo button can be displayed in a record panel interface (e.g., via software) or be part of a hardware device. Thus, the user records the dictation in sections, rather than the entire dictation in a single step.

This allows the user to review each section, undoing the "take" of the last section and rerecord it before continuing to the next section, if it was unsatisfactory. For instance in one embodiment of the invention the Undo button erases any existing section of recording. Clicking the Record button, when positioned within the erased segment automatically inserts the newly recorded audio into that section. A majority of dictation is organized by the person making the recording into groups of ideas. Users typically record each set of ideas, revising the recording by repositioning over the incorrect material and rerecording it. Embodiments of the invention attempt to tap into this organizational approach by formally allowing the user to record each section, separated by a press of the Stop button. This provides for better control over the positioning than manual tape recording-based methods, and is clearly superior to recording the entire dictation without making errors (or having to rerecord the entire dictation). Positioning to a section other than the last section recorded requires buttons to move to the current location. This can be accomplished using conventional incremental movement or using an approach that allows direct movement to a specific point of playback or recording. The device may also contain a "Mark" button designed to flag or identify a particular portion of the recording for subsequent playback. Users can identify any existing section of a recording by depressing the Mark button to associate an appropriate identifier with that portion of the recording.

Once such recordings are made (see e.g., step 210), users can elect to perform more recording (see e.g., step 200) or edit the recording by executing an edit operation that uses one or more text representations (see e.g., step 212, 214). In one or more embodiments of the invention, the system is configured to represent the recorded content as a series of text characters in a text edit field of the user interface. The user may then edit the recorded content using conventional text editing controls and strategies. The text representations may represent one or more Samples of recorded content (e.g., audio data) as a single character. Various implementation of such text editing are contemplated. For instance, the system may base the choice of characters on the amplitude of an audio signal, on a frequency analysis of the audio signal, or on speech recognition of the phonemes and/or words spoken. An example case of this implementation would be translation of a recording (e.g., audio data) to text, thereby allowing the user to edit the recording as if it were written information. The recorded audio data, however, would be edited in parallel with the written text. For voice recordings, most audio editing is limited to rearranging groups of sentences. The complexity of editing waveforms is unnecessary when detection of spaces between words is adequate. However, in some instance the ability to edit waveforms is advantageous and thus within the scope of one or more embodiments of the invention.

The device implementing one or more aspects of the invention may contain a remote button for specifying "marks" or "bookmarks" in the file. For instance, a speaker or member of an audience could use the remote button to identify different sections or topics within a speech. The user of the device could Click at points in the speaking where important transitions or events occur. This allows a person enhancing the recording with annotations to manually transcribe the statements made at the click point.

The device implementing one or more aspects of the invention (e.g., a dictation or other type of device) may utilize a mechanism for controlling recording and playback. This mechanism can take several forms, but is in one embodiment of the invention a control positioned under the user's thumb. The control can be a circular disk ("Position Slider") with the turning access parallel to the thumb so that the user can roll it in two directions with a slight movement of the thumb. The user can press the Position Slider using a clicking action (with tactile feedback) and rolls the Position Slider to change the location of the recording. Audible or visual feedback can indicate the position where in the linear recording would be if moved by that amount. Pressing the Position Slider (e.g., clicking) will force the current location to that position. In one embodiment of the invention a spring-loaded feature returns the Position Slider to the middle position when the user's thumb releases contact with the Position Slider. If the user does not click the Position Slider at a location, the current location is not changed.

Method for Positioning within a Linear Recording:

The device configured in accordance with one or more embodiments of the invention can utilize a method for positioning within a linear recording. The method can be implemented as a hardware device control as described above or via a Graphic User Interface (GUI). The visual display of the control comprises a linear control area with tick marks and a can contain any graphics, but may show a Play button. The slider is configured to reside in the approximate middle of its range except while the user has it depressed either via a mouse (in the GUI instance) or in actuality as would be the case in the hardware implementation. Each "detent" (tick mark) in the control represents an offset point (e.g., one second) from the current playback time (before or after the current time depending on which side of the middle idle position the user moves to). When the user clicks and holds the graphic slider, the slider graphics switches from an inactive play button to an active (depressed) play button (assuming we have control over that), and the sound starts playing from the current playback location. The user can move the slider while keeping it depressed with the mouse button down. As a detent is crossed, playback restarts from that relative location in the file. So, for example, if the user clicks and moves the slider three detent marks to the left, playback would start momentarily at the current time, then one second before, then two seconds before current, then three seconds before. The effect is slightly like scrubbing on a tape, except that playback is always in the forward direction (no backwards tape sound like in real tape scrubbing). If the user keeps the slider at one point, playback continues. If the user moves the slider again, playback resets to each tick mark location that is crossed until motion of the slider is stopped. When the user lets go of the mouse button, the playback stops. The relative position of the slider becomes the new current location. For example, if the user moved to the left 3 tick marks and then released the mouse button, the new current time would be moved back 3 seconds. If the user releases the mouse button in the middle, the current time does not change. When the user releases the slider in any position other than the middle, the program automatically moves the slider back to the middle position (at the same time as resetting the current position and turning off playback). If the program is already playing when the user manipulates the slider, the behavior is the same, except that playback continues after releasing the slider (instead of stopping).

Presentation Event Capture:

As was previously mentioned above, the invention described herein has various uses. An example of one such use revolves around visual presentations (e.g., Microsoft PowerPoint™ or other audio, video, or multimedia presentations). During such presentations embodiments of the invention can be adapted to capture the events occurring in the presentation as annotations in the audio recording. For instance, each annotation could include reference information about the slide being displayed at that moment in time along with the application of a unique number attribute being applied, as with any other bookmark. Real-time or post processing of the presentation file, combined with the annotated audio recording, can result in the generation of a multi-file, multimedia document in the server that is allows for a replica of the presentation as it occurred to be generated at a later time (from the server information). The user accessing such a document can see the whole presentation, in linear sequence, or jump to various points in the presentation based on the annotations. The globally unique identification applied to each event in the presentation allows users to directly access points within a presentation without having to specify the document or relative position within the document.

Method for Dividing Audio Files:

In one embodiment of the invention original recordings can be split into multiple output files. The split point is determined by the notes (annotations, bookmarks, marks) that are associated with the recording. Optionally, the exact location of splitting can be further optimized by evaluating the content of the recording. Splitting on a silence (in the case of voice), or a strong beat (in the case of music) is preferable. The multiple output files are played back by the user using a device or software/hardware that locates and plays the files. For instance, playback could be accomplished via a CD-ROM device (such as an MP3 compatible audio CD player or computer system with a CD-ROM reader), a local or wide area network (e.g., LAN or the Internet) disk drive connected to a client computer with appropriate software, or a hardware and/or computer device that plays the file from the local disk drive.

When the end of the file is reached, the next file in sequence is automatically located and played. This method makes it possible to "stream" a linear recording from any server while retaining the ability to randomly access points within the recording. This is different than the various existing methods which require a special streaming client to assemble segments of media data (presumably in uniform-sized packets). These existing methods require a specialized client and server components. The server typically delivers packets of the media file to the client, which assembles the packets into sequential order and plays them the packets to the end-user at the correct time to provide seamless playback. A streaming protocol, such as RTSP, coordinates the communication between the client and server. Such protocols provide for a variety of optimizations such as the delivery of media through poor connections, random access to any point in the streaming media file, and media bit rate adjustment to find the most reliable delivery at the highest media bit rate. The disadvantage of these types of streaming systems is that they require specialized client and server software to be installed, managed and maintained.

Embodiments of the invention do not require a specialized streaming server, may rely on any file delivery system, and may also use existing playback clients such as Flash MX, which can retrieve and play the separate files in sequence, through programmable control of Actionscript. A similar method is possible using a Java script on Java-enabled browsers. These systems depend on assembling uniformly packaged audio packets at the client side. The method described herein differs from prior art techniques in that it has the ability to retrieve non-uniform segments of media that have been divided on boundaries that prevent loss of time-dependent information. In other words, if a segment of a recording arrives late, it's late playback on the client side does not result in significant alteration of meaning (especially for voice data), as the addition of extra time in the playback is positioned between semantically separate units of the media.

In an embodiment of the invention files generated by the system can be written onto a CD-ROM or other data storage medium. In the case where audio segments are split into separate section and encoded in a format (e.g., MP3) the text of annotations (notes, bookmarks, marks, etc) are incorporated into the media file (e.g., in an MP3 file as "ID3 Tags"). This allows for viewing of the notes in a standard audio MP3 player, enhancing the user's ability to position to desired sections of the larger recording.

Method for Reassembling

Embodiments of the invention also contemplate a method for packaging and delivering multimedia content and metadata information referencing content. The system solves a number of electronic content publishing problems that are not addressed by existing technologies. There are many different situations where multiple files are generated (e.g., using embodiments of the invention). In such cases it may be advantageous to deliver the individual files as a cohesive unit (e.g., a single file). This process is referred to herein as packaging and some examples of the type of data that may be contained in package files are described in further detail below.

Packaging

Information processed by the system may utilize three primary types of data:

Multimedia content data for presentation to user (e.g., text, audio, video, etc. . . . ).

Metadata ("contextual information") for use in search and retrieval of the content data.

Administrative data, which could include:

Authentication of the originator of the data.

Instructions for controlling access to data.

Repository management instructions, such as archive and destroy dates.

Instructions on how the data should be forwarded to other points in the system.

The system creates packages of data, containing one or more of the above data types, into a single file to simplify delivery and management. The format of the system's data file may contain one or more data files packed into a single file using a proprietary "flat file" format, one or more data files packed into a single file using a standard format, such as a ZIP data file, or key values, records, or objects stored in a database that uses a single file as the database representation. In the case of a packaging system based on a database, the database file size may be reduced using the technique described herein.

When storing a database node in the database file, the node is compressed using a suitable data compression algorithm. After the size of the compressed node is determined, a location in the physical data file is determined. The physical file can be laid out in fixed sized blocks. One or more blocks can be dedicated to storage of a Node Location List that correlates the logical node location with the physical location in the database storage file. A file header in a predefined location (normally the beginning of the file) indicates the location and format of the fixed sized blocks, a pointer to a linked list of blocking with available space, the location of the Node Location List, and other data for managing the file. Within each block, the space may be subdivided into smaller spaces ("sections") of specific sizes.

Storage of Node as a Single Variable Length Entry.

Each block can have a header with a list of variable length sections in the block. Blocks with available space are included in a list of free space in the file header. When storing a compressed node, the system looks for a block with sufficient space to store the entire node. If a node stored in a block increases or decreases in size, space allocation in the block is adjusted accordingly. If the node is too large for the block, it is moved to another block with more available space.

Storage of Node Split into Multiple Parts.

The blocks in the file can be divided into sections that are fixed in size (one implementation would use powers of 2 in size, such as 16, 32, 64, 128, 256, 512 bytes). When a node is stored in the file, it is split into one or more parts, based on the fixed size sections in the blocks. For example, a 600-byte node could be split into parts of 512, 64, and 32 bytes. Each of the parts would be stored in different locations, with pointers to them to facilitate retrieval (either in the Node Location List or in the form of a linked list). Information in the header for each block is used to identify the layout of the sections of the block. This allows a file reclamation utility program to be able to scan each block to locate the sections contained in it, in the event of a corrupted file. Within each block, additional control information identifies the logical location of the node data stored at that physical location. This could be used by the file reclamation utility to identify the specific logical database data located in the block for the purposes of reconstructing the node data.

Once the physical location is determined, the node data is stored in the block, and a pointer to that location is stored in the Node Location List. The list of available space may also be updated at this time. As database nodes stored in the file increase or decrease in size, the system automatically relocates the node data to an appropriately sized section in the file blocks. Various routines may be included in the system to optimize the use of storage space. This could include, for example, routines to modify block layouts, moving node data automatically to an optimal storage pattern.

Retrieval of node data involves the following steps: 1) look up physical node location in the Node Location List; 2) read block and extract node data. If the node is stored in multiple parts, retrieve each of the parts and reassemble into a single buffer; 3) uncompress data; 4) pass uncompressed node to database processing routines.

This method of storing variable-length node information in a fixed-format file structure has many benefits, including (but not limited to):

Efficient space utilization compared to conventional database formats, which typically contain 50% wasted space. This is especially important for system files shared over the Internet and archived in repositories, where transmission speed and space utilization are important factors.

Space utilization remains high even after database changes are made, as blocks can be reconfigured as node sizes change.

Reasonable balance between performance and space usage. Especially on modern, fast processors and disk drives, the additional time to reconstruct node information is minimal.

Ability to reconstruct partially corrupted database files using control information.

Packaged Data Retrieval.

When files are packaged it is necessary upon delivery to extract each of the packaged files for processing and/or display. An embodiment of the invention provides a system for extracting files using standard Internet Protocols (e.g., TCP/IP and HTP, and/or other Web or Internet Protocols). When the system needs to access data contained in a packaged file the system initiates a playback process ("Player") that may use as a parameter the name of the package file and optionally the name of a specific file ("sub-file") for extraction. The playback process determines if a local server process (e.g., a playback server configured to play package files) is already running. If not the Player initiates the local server function, opening an HTTP listening port on the built-in Localhost IP address. Once a local system server is running on the user's computer, the Player program launches a web browser, specifying the URL as the localhost port of the running server, with the file name of the file to be retrieved encoded in the URL. For example, to retrieve the file "example.trn", the URL might be: "http://localhost:8085/example.trn/index.html".

When the running system server receives a request for this URL, it decodes the file name, opens the file, extracts the requested sub-file (such as index.html), returning it to the web browser through the Localhost port using the standard HTTP server protocol. If the optional sub-file is not specified the system returns a default file as indicated within the package file.

Auto Playback.

If the user double clicks on the file through a standard GUI interface, the file association established in the operating system will automatically launch the system Player program with the file as a runtime parameter. The file is then delivered to a local web browser as described above.

Method for Merging Annotations and a Recording (Audio or Video)

One or more embodiments of the invention provide a mechanism for merging annotation and a recording. When an audio or video recording is made using a computer or dedicated digital recording device the date and time of the beginning of the recording is incorporated into the recording file. On a separate computer or dedicated device, the user will create annotations. This might be as simple as entering marks (sometimes called "Bookmarks"), or notes in text or other types of media (such as digital ink, digital photographs, voice annotation, etc). Whatever the type of annotation, the digital annotation includes a date and time stamp. Systems implementing one or more aspects of the present invention may utilize post processing in software (or dedicated hardware device) to merge the audio/video recording based on the timestamp of when the recording began and the timestamps of each annotation. These annotations may be given unique identifiers, just like when the recording and annotation occur on the same computer/device. The resulting digital file (or in some cases, two files) allows the user to access any point in the recording directly using the pointer contained in the annotation.

Method for Automatic Segmentation of Recording.

An embodiment of the invention also contemplates the implementation of a process for automatically segmenting a recording of data (e.g., video). In such cases, the still images are selectively excerpted from the video at various intervals. The rules for selecting the image could include:

Periodic intervals (once per minute, for example)
Using scene change detection based on the video image.
Using segmentation of discussions based on audio information
A combination of audio and video change detection.
Manual user input of event marks.
Method for Annotating an Audio Recording with Thumbnail Images.

Embodiments of the invention may also include a method for annotating an audio recording with thumbnail images. When a video recording is made of a meeting or other event, if it is captured in analog form it must first be digitized. When digitized the digital video information can be separated from the audio information so that the audio information can be retained completely. The still images can be selectively excerpted from the video at various intervals. The rules for selecting the image could include:

Periodic intervals (once per minute, for example);
At points where automatic or manual annotations have been entered.

Thumbnail images are treated the same as any other annotation in the system, with the assignment of a unique id for retrieval of audio at the time that corresponds to the image. Additional implementations of this concept include the application of this technique to the archival of meeting information (as compared to a security monitoring system, for example).

Thus, a description of a method and apparatus for treating and retrieving recorded data has been set forth. The claims, however, and the full scope of any equivalents are what define the meets and bounds of the invention.

Knowledge Broadcasting and Classification System.

Embodiments of the system may utilize a Knowledge Broadcasting System for specifying content metadata and locating Internet documents. In this instance embodiments of the invention comprise an improved manner of specifying the content of an Internet document in such a way that the users of the system are able to retrieve relevant Internet documents. This is accomplished using a three-tiered search engine where the first-tier is denoted as a category search, the second tier is denoted as a context search, and the third-tier is denoted as a keyword search. At each step relevant information is filtered out and the focus of the search is narrowed. In the general search, the user narrows the focus of the search by selecting a hierarchical definition. For instance, the user searching for a person named Bill, might select a Government hierarchy. In this way a vast number of non-relevant pages are filtered out because the web developer has included a tag within the relevant pages which indicates that this page falls hierarchically within a Government category. This eliminates the problem where the user is seeking references, for example, to "Bill Clinton", the ex-president and not "Bill Blass", the fashion designer.

Next the user further narrows the search by specifying a context in which the word Bill should be retrieved. This second tier to the search may contain fields such as "who", "what", "when", and "where". Here, for instance, the user can enter (who—name of person). These fields are specific to the position in the hierarchy that the user has specified. In this way, the search engine identifies pages relating to persons named Bill and not bill collectors, or the Buffalo Bills, because, these contexts are part of the Internet document design and the site developer has specifically included in the Internet document a tag to the effect that this document relates to a person's name.

In the third tier of the search the user enters the name Bill, or another keyword desired, as with the full text and vector search engines. The search engine then interacts with the Internet documents which have information regarding the above-described three step process already categorized and classified in their headers. In this way an improved system for locating documents is described. This system which is referred to herein as the Knowledge Broadcasting and Classification System, will now be described in more detail below.

The classification information is encoded manually or automatically into a set of specifically structured attributes (collectively referred to as a "Knowledge Object". The Knowledge Object Attributes describe the information contained in a document. The Knowledge Object includes a pointer referencing the location of the content being classified (such as database record, database object, digital document, or real-world object or event). The Knowledge Object may be stored together with the content being classified, in which case the pointer to the content is implied, rather than explicit.

The Knowledge Object Attribute consists of three, hierarchical classification parts:

1. General Classification Category (e.g., a first-tier, category search). This is the overall type of information that is being specified in the Classification Type and Classification Detail.

2. Classification Type (e.g., a second-tier, context search). This is a subdivision of the General Classification Category, indicating the type of information contained in the Classification Detail. By convention, a particular meaning is coded in this part. That is, the "who", "what", "where", "when", "why", or "how" type of information. The Classification Type may be a more specific type of each of these broader types. For example, "who" could be more specific, such as "person", "company", "organization". The Classification Type may also be an arbitrary sub-classification of the General classification category.

3. Classification Detail (e.g., a third-tier, keyword search). This is generally a keyword or key phrase indicating more detail about the content. Alternatively, it may be an arbitrary sub-classification of the Classification Type.

EXAMPLE KNOWLEDGE OBJECT ATTRIBUTES

Photography/Who/Canon [the photographic equipment company, "Canon"].
Photography/What/Camera [photographic equipment].
Photography/Where/Japan [company location].
Music/Who/Bach [the composer].
Music/What/Canon [musical style].
Music/Where/Germany [composer's home country].
Music/When/18th Century [time period of Bach's compositions].
Religion/What/Canon ["Canon Law" of the church].
Religion/Who/Church of England [religious institution].
Religion/Where/England [country of the religion].
http://DomainName/Arts/Visual_Arts/Photography/Cameras/ | Who | Canon.
Photography | what | http://DomainName/Arts/Visual~Arts/Photography/Cameras/35 mm/photography | http://dictionary.DomainName/search?q=where | Japan.

Combining Attributes.

The primary objective of this approach to classification is to provide enough detail in the Knowledge Object to allow a person or a program to determine whether the contents of a document merits retrieval, storage, forwarding, or other processing actions of value to the user. To accomplish this, the Knowledge Object attributes can be combined in an unlimited variety of combinations to produce whatever level of detail that may be required.

Mutual Understanding.

The success of this approach to classification is dependent of the fact that the classifier of the content (Content Producer) and the user of the content (Content Consumer) both have an understanding of the attributes values that will classify the document in a meaningful way. These two parties will explicitly or implicitly agree on types of attributes that will provide access to documents of interest to the Content Consumer. In that way, the classification system itself does not need to have any understanding of the content knowledge domain.

Specification of Attribute Values.

An attribute may be specified as an alphanumeric text value (as shown in above examples). The value may be a word or phrase that is suggestive of the meaning of the attribute. In this case, the Content Producer may guess about the choice of values that the Consumer will specify to locate the desired meaning. The attribute value may also be an arbitrary designation agreed upon by Content Producer and Content Consumer.

Alternatively, the attribute may be a URL that points to a document on the Internet that specifies the meaning of the attribute (Attribute Specification Document). The meaning of the attribute contained in the Attribute Specification Document may be coded in a number of forms, including (but not limited to) an unstructured text document, a database allowing access to formatted data, or an XML document formally specifying the information.

Storage of Knowledge Object.

The Knowledge Object may be stored in a number of ways. For example, as a distinct file, embedded in a document as metadata, or stored in a database such as that employed by a search engine.

The attribute parts may be stored in the Knowledge Object as a literal representation (such as text). It may also be stored, retrieved, transmitted, or otherwise manipulated in an alternative representation.

One important variation of an alternative representation is a generated numeric value. In this case, the literal text of the attribute information may be converted into a pseudo-unique number by passing the three attribute text values together as a single unit through a "one-way" hashing function. The output of such a function would be a numeric value that represents the attribute. This number would be used to facilitate processing of the attribute. For example, the Content Producer would be able to efficiently deliver the Knowledge Object, which has been reduced to a collection of one or more numbers, to a Content Consumer. The numeric representation also is beneficial for storage and searching of attributes in a database system.

Transmission of Knowledge Object.

The Knowledge Object may be transmitted between users of the system by any appropriate means, including (but not limited to), removable data storage, email, local area network, client-server communication, or peer-to-peer communication.

Evaluation of Knowledge Object.

The Content Consumer uses the Knowledge Object to evaluate the information contained in a document for retrieval or other processing. The Consumer creates a Knowledge Object describing the attributes of the data being processed. This is then compared with the Knowledge Object(s) provided by the Content Producer. When a match is found, the document is processed as required.

In the case of a Knowledge Object that is represented as a numeric value, the test attributes created by the Content Consumer are first converted into a numeric value, using the same function as the Content Producer, before comparing with the Knowledge Object created by the Content Producer. A matching number is assumed to be a matching attribute.

Depending on the function used to produce a numeric attribute value, and the length of the resulting value, there is a slight probability that a false match will occur. This will not present a problem in most document processing applications. For example, the probability is greatly reduced when multiple attributes are used together to qualify a Knowledge Object as meeting the desired characteristics. For applications that require a higher degree of precision, the system can verify a matching attribute value by retrieval of an unconverted copy of the text values (stored in a Knowledge Object, either accessible separately, or embedded in the target document).

Benefits of the Knowledge Broadcasting and Classification System.

When compared to existing classification technologies it is clear that the Knowledge Broadcasting and Classification System (KBCS) described herein provides a number of benefits. For example, the KBCS provides more accurate search results compared to searching for documents using full text search engines. The existing full text search engines use a number of algorithms to locate documents that are most likely to be of interest to the searcher. When search keywords or key phrases are unique, the full text search process is successful. However, when searches use words that are common, or have multiple meanings, there is no reliable way for the search engine to determine the desired document.

Various strategies are employed by search engines to reduce the inaccuracy of full text searching. One well-known example is the Google™ methodology of relying of counts of references to a document to increase its likelihood of being the desired document. This works well for documents that are popular. However, for any document that is not heavily referenced by other documents on the Internet, there is no way for this to have a high enough score to be displayed as a relevant document. In addition, just because a document matches the keywords, and is popular as indicated by reference counts, this does not necessarily indicate it has the desired content. The example Knowledge Object Attributes described above, illustrated the various meanings of the word "canon", depending on context. Simply typing in the word "canon" into the Google™ search engine produces several pages of references to Canon™ the company, but no reference to other uses of that word.

With the Knowledge Broadcasting and Classification System, the person searching for a document can specify more detail about the search keyword or key phrase to increase the meaningfulness of that text.

Another way that full text search engines attempt to improve search quality is through the use of semantic analysis of the documents being indexed. This involves evaluation of the meaning contained in the document. This can be a major improvement compared with system that just analyze of the occurrence of words and phrases. When employed with manual classification, the Knowledge Broadcasting and Classification System provides an enhancement over the semantic indexing approach. The person classifying a document can consider various search strategies that may be employed by the person searching for documents. By producing a Knowledge Object with a rich collection of attributes that will match with various search strategies, the target document will have a greater opportunity to be retrieved, compared to the semantic analysis approach that is limited to a machine-level understanding of the meaning (and has no way to take into consideration the search strategies that will be used).

Application to Annotation.

The Knowledge Broadcasting and Classification System can be used to specify contextual data about an annotation being entered into a database. The Knowledge Objects applied to the annotations can then be used as an alternative method for locating an annotation.

Application to Search Engine.

The Knowledge Broadcasting and Classification System can be combined with a search engine database to create a more advanced form of search engine. When a document is created, its contents can be classified into a Knowledge Object. This process may be manually performed by a human classifier, or automatically through the use of software to extract classifications from the document. This resulting Knowledge Object is then entered in a search engine database.

Users seeking access to the classified document will create set of attributes describing the document desired. These attributes will then be compared with the attributes stored in the database to find matches to documents for retrieval.

Application to Distributed Search Engine.

A variation of the search engine application is to enter the Knowledge Object information into a distributed database system. This would allow for people or software to perform the search operation at any node in the database system. The system of distributing the Knowledge Object information could include any method of communication, including copying of data using removable media, email, client-server communication (such as web server/browser), and peer-to-peer networks.

The Knowledge Broadcasting and Classification System also provides unique benefits for such a distributed approach to searching. By reducing classification attributes to a numeric value, these can be distributed more efficiently, by reducing the size of the attributes, and by reducing the processing power required to store and search the values entered in the database.

In addition, the approach describe here would allow each node in a search engine distributed database to perform analysis of the Knowledge Object to enhance system performance. For example, some nodes in the search engine network could serve as distribution hubs. In this case the node would evaluate each Knowledge Object to determine where it should be delivered elsewhere in the network. This could include features such as selective distribution based on specialization of another node's search database (to store only content meeting some specified type), or subscriber-based forwarding, where a user may request to have only Knowledge Objects matching a specification to be forwarded to them (or to a node in the distributed database system under their control).

Application to Recommender Systems.

The Knowledge Broadcasting and Classification System could provide a classification methodology for systems to make document recommendations. Some existing Recommender Systems allow individuals to identify documents that may be of interest to others, and provide a technical means for this recommendation to be communicated to other users of the system.

The Knowledge Broadcasting and Classification System's approach to classification would allow for detailed description of the content of a recommend document, without the Recommender System itself needing to have understanding of the knowledge domain.

In addition, the Knowledge Object can be used to filter recommended documents, reducing the number of documents to be reviewed by an end-user to just those with the desired contents. And a Recommender System could be built on a distributed search engine database to provide for a user keeping their own collection of Knowledge Objects to allow for processing of information in their personal collection.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A system for locating media data by associating with a classification comprising:
    a first computing device comprising first hardware and first software for controlling the first hardware to perform the following steps:
        creating a multi-part classification attribute value, wherein the multi-part classification attribute value comprises information corresponding to a hierarchical classification, the hierarchical classification being descriptive of media data, and wherein the multi-part classification attribute value comprises at least a classification data representing a category attribute value, a context attribute value, and a detail attribute value;
        creating a knowledge attribute data, wherein the knowledge attribute data comprises an alternative representation encoding the multi-part classification attribute value as a single value;
        classifying the media data by storing the knowledge attribute data and an association between the knowledge attribute data and the media data;
        receiving a media content query comprising at least a query value wherein the query value comprises information corresponding to a hierarchical classification that is descriptive of the requested media data and that comprises classification data representing at least a category search parameter, a context search parameter, and a detail search parameter; and
        retrieving the association between the knowledge attribute data and the media data wherein the multi-part classification attribute value represented by the knowledge attribute data matches the media content query value.

2. A system of claim 1 wherein the knowledge attribute data comprises an arbitrarily designated value.

3. A system of claim 2 wherein the knowledge attribute data comprises a value suggestive of the meaning of the attribute.

4. A system of claim 1 wherein the knowledge attribute data comprises a reference to an attribute specification.

5. A system of claim 4 wherein the reference to the attribute specification is a URL.

6. A system of claim 1 wherein the knowledge attribute data comprises a pseudo-unique value.

7. A system of claim 1 wherein the knowledge attribute data comprises a generated numeric value.

8. A system of claim 1 wherein the association between the knowledge attribute data and the media data comprises a reference to the media data.

9. A system of claim 1 wherein the association between the knowledge attribute data and the media data comprises an implied reference created by storing together the knowledge attribute data and the media data.

10. A system of claim 1 wherein the media data comprises a recommendation.

11. A system of claim 1 wherein the first program code further causes the first computer to receive the media data using communications means.

12. A system of claim 1 wherein the first program code further causes the first computer to capture the media data.

13. A system of claim 1 wherein the first program code further causes the first computer to send the knowledge attribute data to another computing device using communications means.

14. A system of claim 1 wherein the first program code further causes the first computer to send the association with the media data to another computing device using communications means.

15. A system of claim 1 comprising a second computing device comprising second hardware and second software for controlling the second hardware to perform the following steps:
receiving the knowledge attribute data and the association with the media data;
storing the knowledge attribute data and the association with the media data;
receiving a media content query comprising at least a query value wherein the query value comprises information corresponding to a hierarchical classification that is descriptive of the requested media data and that comprises classification data representing a category search parameter, a context search parameter, and a detail search parameter; and
retrieving the association between the knowledge attribute data and the media data wherein the multi-part classification attribute represented by the knowledge attribute data matches the media content query value.

16. A system of claim 1 wherein the first program code further causes the first computer to associate the media data with a unique ID value for purposes of retrieval.

17. A system of claim 16 wherein the unique ID value is assigned from a predetermined value.

18. A system of claim 17 wherein the predetermined value is assigned by scanning a printed code.

* * * * *